(12) United States Patent
Edevold

(10) Patent No.: US 6,598,334 B1
(45) Date of Patent: Jul. 29, 2003

(54) ASYMMETRICAL CONICAL STRAINER-SCOOP

(76) Inventor: Mark Ronald Edevold, 702 Stuart Ave., Crookston, MN (US) 56716

( * ) Notice: Subject to any disclaimer, the term of this patent is extended or adjusted under 35 U.S.C. 154(b) by 0 days.

(21) Appl. No.: 10/144,086

(22) Filed: May 10, 2002

(51) Int. Cl.[7] .............................................. A01K 69/00
(52) U.S. Cl. ............................................. 43/4; 294/19.1
(58) Field of Search ........................... D7/691; 294/1.3, 294/1.4, 19.1, 55; D30/162; 119/161; 43/4; 210/470

(56) References Cited

U.S. PATENT DOCUMENTS

| | | | | | |
|---|---|---|---|---|---|
| 545,826 | A | * | 9/1895 | Shuman | 294/55 |
| 591,953 | A | * | 10/1897 | Davenport et al. | 294/55 |
| 636,735 | A | * | 11/1899 | Davenport | 294/55 |
| 3,106,419 | A | * | 10/1963 | Estwing | 294/19.1 |
| 3,289,850 | A | * | 12/1966 | Gubash | 210/470 |
| 3,747,253 | A | * | 7/1973 | Gangi et al. | 294/2 |
| 3,799,598 | A | * | 3/1974 | Lavaggi | 294/1.4 |
| D293,066 | S | * | 12/1987 | Ferm et al. | D7/692 |
| 4,718,188 | A | * | 1/1988 | Roberts | 294/1.1 |
| 4,769,939 | A | * | 9/1988 | Gonska et al. | 294/2 |
| 4,866,872 | A | * | 9/1989 | Guilbault et al. | 43/15 |
| 5,072,538 | A | * | 12/1991 | Hendricks et al. | 210/470 |
| 5,140,767 | A | * | 8/1992 | Traut | 210/470 |
| 5,228,226 | A | * | 7/1993 | Porosky | 294/26 |
| 5,970,515 | A | * | 10/1999 | Fishbaugh | 128/858 |
| D426,353 | S | * | 6/2000 | Renforth | D30/162 |

* cited by examiner

Primary Examiner—Peter M Poon
Assistant Examiner—Susan Piascik

(57) ABSTRACT

An asymmetrical conical strainer-scoop adapted for clearing ice chips, ice chunks, and other debris from a hole cut through ice covering a body of water. The asymmetrical conical strainer-scoop includes a perforated asymmetrical conical device of a unique design (30), comprised of a flexible and durable material such as UHMW polyethylene in sheet form, which is perforated with a plurality of straining apertures (20), and which is attached to one end of a handle (10), by means of conventional fasteners (22), (24), (32). The handle (10), has a hole (14) bored to provide means for attachment of a wrist-hanger strap.

16 Claims, 5 Drawing Sheets

ASYMMETRICAL CONICAL STRAINER-SCOOP

FEDERALLY SPONSORED RESEARCH AND DEVELOPMENT

The development of this invention has had no involvement with any federally sponsored project, or program.

SEQUENCE LISTING OR PROGRAM

Not applicable.

BACKGROUND—FIELD OF INVENTION

This invention relates to an improved tool for clearing ice chips, ice chunks, or other debris from holes bored, sawed, or chopped through the ice for the purpose of ice fishing.

BACKGROUND—DESCRIPTION OF PRIOR ART

Ice fishing is a popular recreational and commercial activity, which occurs in northern regions during the winter. By necessity ice fisherman need to bore, saw, or chop holes through the ice to be able to insert either hook and line, nets, or fish attracting decoys or other apparatuses into the water.

A critical step in the ice fishing process is the removal of the slush, snow, ice chips, and ice chunks that typically clog the ice fishing hole after the hole has been bored, sawed, or chopped through the ice.

There are multiple prior art devices commonly employed for removing debris from ice fishing holes. One common device is a metal-handled perforated metal bowl device similar to GANGI, U.S. Pat. No. 3,747,253, with a shallow saucer shaped perforated metallic bowl. These commonly available devices are relatively small, and lack the capacity to remove large quantities of ice chips quickly. They are typically comprised of metallic materials that sink if inadvertently dropped into the water, and further, the handle, bowl and perforations often freeze up with residual ice rendering the device ineffective. Attempts at striking the device in an effort to remove the residual ice buildup often results in the device bending into an inefficient shape.

A thorough search has also discovered several other types of ice chip removal devices such as, HENDRICKS, et al. U.S. Pat. No. 5,072,538, and ROBERTS, U.S. Pat. No. 4,718,188, which have moving parts that can become inoperable with residual ice buildup. These devices must be de-iced in a warm environment to be ready to use after icing up. These devices also lack the capability to remove larger chunks of ice.

There are also commercially available strainer devices which utilize fixed injection molded plastic strainer baskets attached to metallic handles. Again, the strainer baskets are too small and are also composed of inferior plastics which become brittle and crack or otherwise fail when used in the sub-zero temperatures common to ice fishing, and again, these devices sink when inadvertently placed into the water.

Nowhere in the prior art is there found any teaching of the improved method to fashion a conical strainer basket from a flexible, sheet form, non-metallic material such as UHMW polyethylene that can repeatedly withstand the significant impact and flexing stresses needed to rid the device of unwanted residual ice at subfreezing and sub-zero temperatures.

OBJECTS AND ADVANTAGES OF THE INVENTION

An Ice fishing skimmer, dipper, or scoop is a device for separating snow, slush, ice chips, ice chunks, and other debris from liquid, i.e. water, in an ice fishing hole that has been either bored, sawed, or chopped through the ice.

The present invention is an improved ice removal device in that it is simple; composed of a superior material that is durable and will not crack or break in sub-freezing and sub-zero conditions. It is constructed in an optimum size by which to substantially reduce the time involved in the ice chip, ice chunk removal process so that more time is available for the ultimate goal of the activity, fishing.

Accordingly, several objects and advantages of my invention are the simplicity, durability, effectiveness, and ease with which it can be used.

Accordingly, it is an object of the present invention to provide an ice scoop which can be easily inserted into a hole bored through the ice covering a body of water, and effectively and quickly remove the debris clogging the hole.

Another object of this invention is to provide an ice scooping device which is composed of non-metallic, floatable, buoyant materials so that if the device is inadvertently placed into the water it will float.

A further object of this invention is to utilize very durable polymeric materials such as UHMW polyethylene, high-density polyethylene, ABS plastic, nylon, urethane, or other such compounds or metals that are strong and resist breakage in sub-freezing and sub-zero conditions. Some of these materials are difficult, if not impossible to injection mold, so that the unique design of the asymmetrical perforated conical strainer-scoop device as set forth in the claims section, and as illustrated in the drawings and described in the description, is a unique way to utilize a flat sheet of flexible or semi-rigid material to construct an asymmetrical cone shaped strainer-scoop.

UHMW polyethylene is the preferred material for this embodiment because of its inherent durability and resilience at sub-zero temperatures. UHMW poly (abbreviation of Ultra High Molecular Weight polyethylene), is commonly used to manufacture durable components used in cold environments such as CORMICAN U.S. Pat. No. 6,331,008 (one piece molded ski apparatus). One common drawback of UHMW poly is that it is difficult if not impossible to injection mold; compression molding being the only feasible alternative. However, compression molding of UHMW poly has limitations, and it is an unsuitable process for relatively thin, perforated parts such as the asymmetrical perforated conical strainer-scoop of the preferred embodiment. When UHMW poly is subjected to the extreme temperatures and pressures of compression molding, it tends to produce uncontrollable warping in thinner parts, thus producing unusable and undesirable results. It is for these reasons that I chose sheet form UHMW poly as a better material with which to produce a perforated conical strainer-scoop. Sheet form UHMW poly can be sawed, drilled, or die cut to produce the desired pre-determined dimension. The preferred embodiment utilizes a die-cut perforated conical strainer-scoop.

This asymmetrical perforated conical strainer-scoop can be attached using conventional fasteners to an elongated handle, (rectangular, square, or round), made of a non-metallic floatable, buoyant material such as wood, foam-filled plastic tubing, or solid buoyant plastic compound.

A further object of this invention is to utilize the surface of the handle to be printed with a ruled measuring graphics to aid ice fishermen in measuring ice thickness and fish length.

Another object of this invention is to provide a means to construct various size and dimensions of asymmetrical conical scoop devices out of flexible or semi-rigid sheet material.

Yet a further object of this invention is to utilize the durable perforated asymmetrical conical scoop device mounted on a handle for uses unrelated to ice fishing, such as a scooper for picking up canine feces from grass, dirt, concrete and other hard surfaces. A design for a canine fecal matter scoop is made by notching teeth into the leading front archuate edge of the asymmetrical perforated conical scoop so as to facilitate scooping and lifting up of canine fecal matter.

Other objects and advantages of the present invention will be apparent and understood from the following detailed description when taken in conjunction with the accompanying drawings.

SUMMARY

In accordance with the present invention an ice fishing strainer-scoop comprises an asymmetrical conical strainer-scoop device attached with conventional fasteners to an end of an elongate handle member.

DRAWING FIGURES

FIGS. 1, 2, and 3 show various perspective views of an assembled asymmetrical conical strainer scoop device affixed to an elongate handle with conventional fasteners.

FIG. 4 shows the device prior to the process of being formed into an asymmetrical conical scoop shape.

REFERENCE NUMERALS IN DRAWINGS

| | |
|---|---|
| 10 handle | 14 hole |
| 16 central cirvular pivot aperture | 18 mounting apertures |
| 20 straining apertures | 22 threaded hex head bolt |
| 24 insert nut | 26 panel A |
| 28 panel B | 30 asymmetrical conical strainer-scoop device |
| 32 flat washer | |
| 34 ruled measuring graphics | 36 toothed front edge |

DETAILED DESCRIPTION—FIGS. 1 to 4

Figure 1:
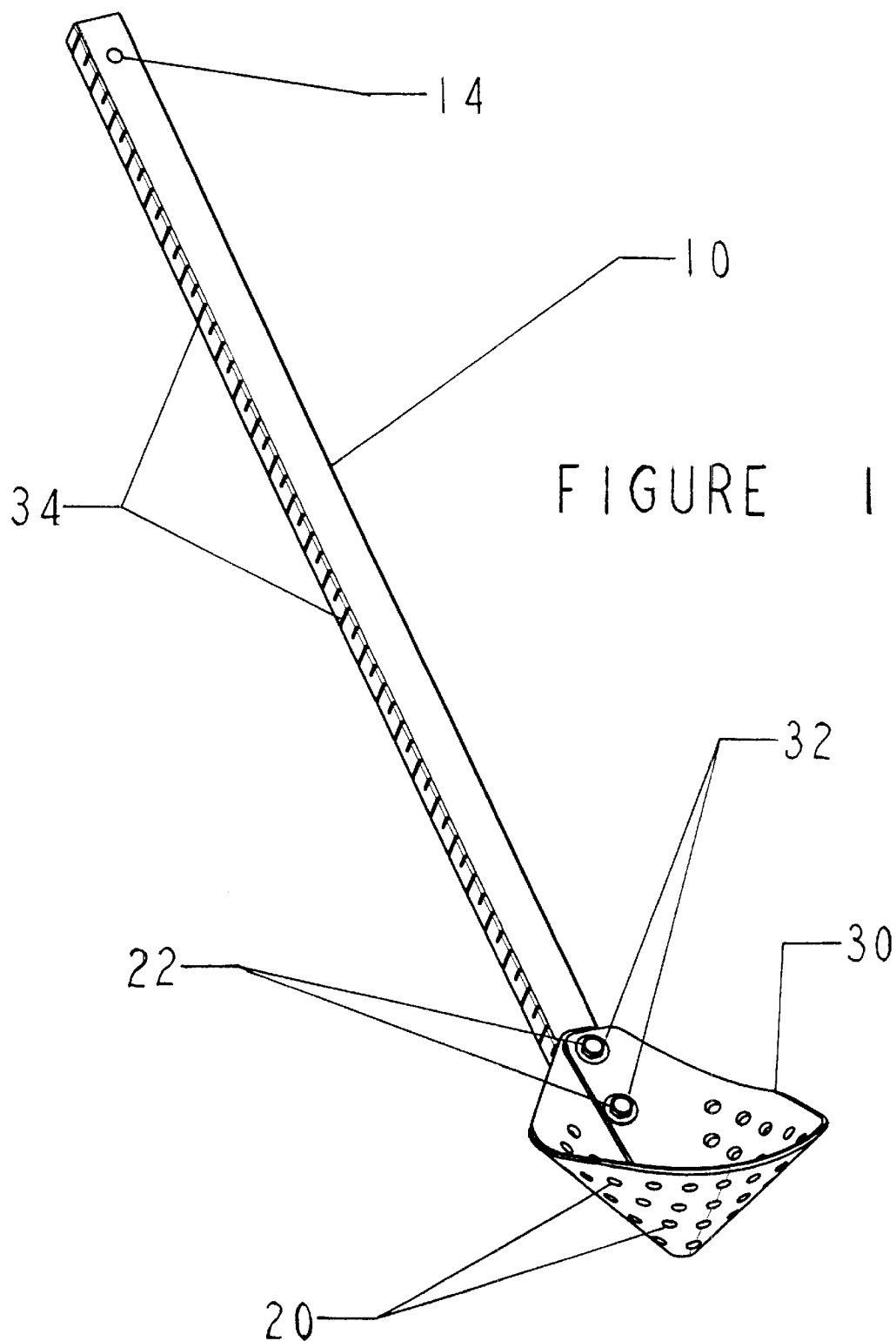
Figure 2:
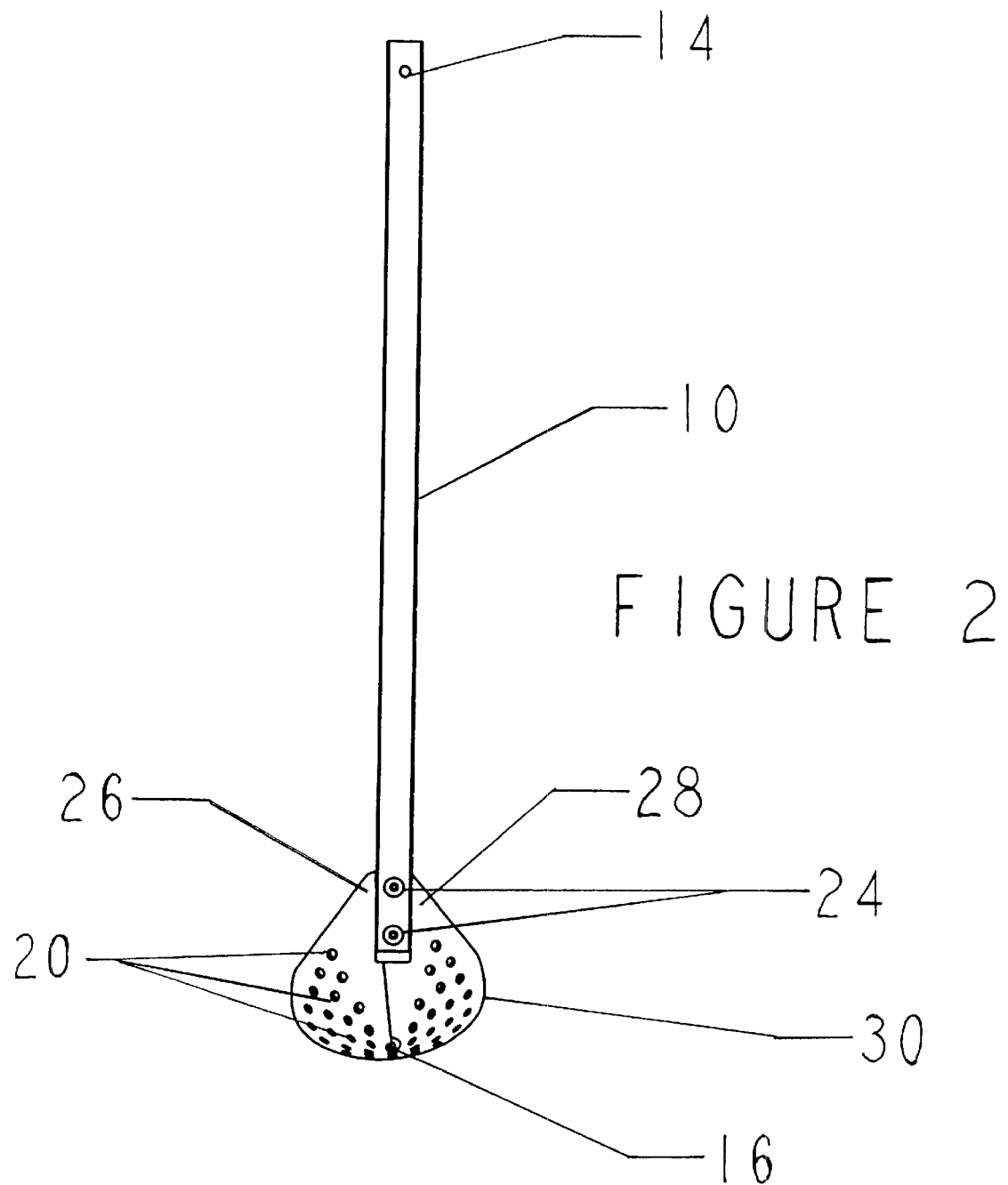
Figure 3:
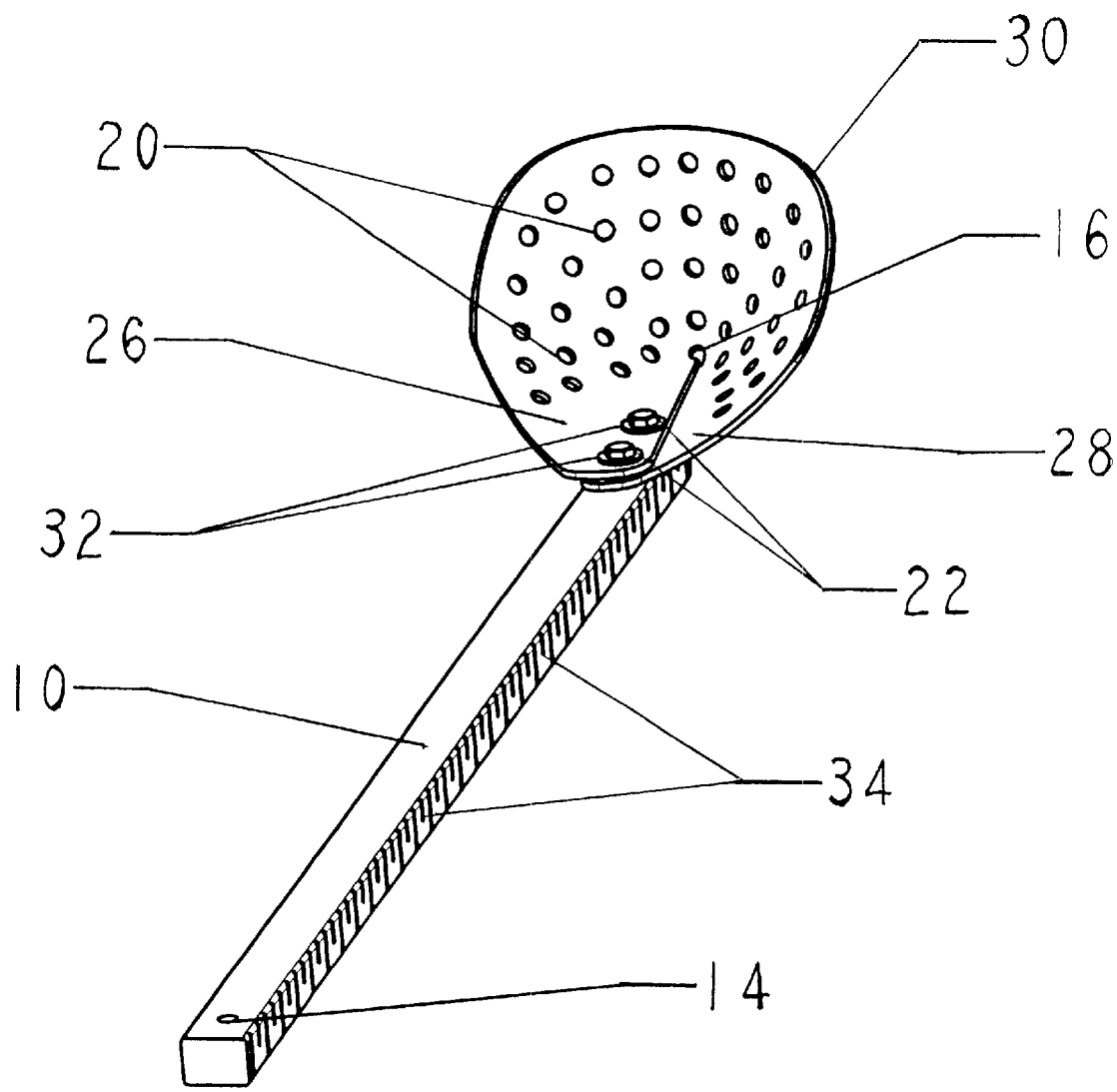
FIG. 3 shows a fully formed asymmetrical conical strainer-scoop device with fasteners installed, and illustrates the location of panel A, and panel B as described in the detailed description.

A typical embodiment of the present invention is illustrated in FIG. 1 (front view), FIG. 2 (back view), and FIG. 3 (front perspective). The strainer-scoop device is comprised of an asymmetrical conical strainer-scoop device 30, attached with conventional fasteners (threaded hex head bolt) 22, flat washer 32, and insert nut 24, to an end of an elongate rectangular wooden handle 10, printed or otherwise marked with ruled measuring graphics, 34. In the preferred embodiment the asymmetrical conical strainer-scoop device 30 is composed of UHMW (Ultra High Molecular Weight) polyethylene in sheet form available from Seelye Plastics Co., Bloomington, Minn. However, the asymmetrical conical strainer-scoop device 30, can be constructed from other flexible or semi-rigid sheet plastics such as ABS, nylon, urethane, high density polyethylene, polycarbonate, etc., and also sheet metals such as aluminum, steel, or brass.

Also apparent in FIGS. 1,2 and 3 is a hole 14, bored transversely through the upper portion of handle 10, for hanging or for an optional wrist strap. Yet another feature of design apparent in FIGS. 1,2 and 3 are the straining apertures, 20, that allow water to pass out of the asymmetrical conical strainer-scoop device thus separating the residue for removal. A handle, 10, also shows riled measuring graphics, 34, printed on it's surface.

Figure 4:
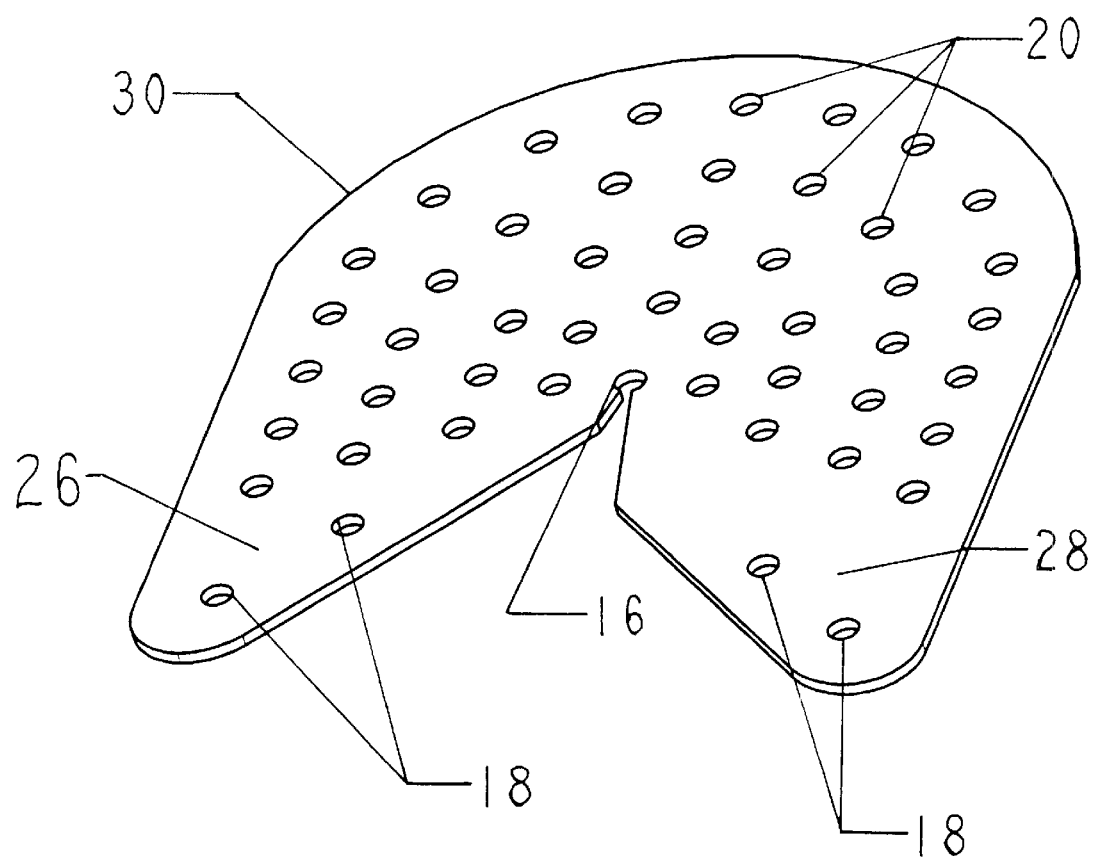
FIG. 4 is a perspective view of a unique design of a flat sheet of flexible material cut to predetermined dimensions, and perforated with holes.

The asymmetrical conical strainer-scoop device 30, as shown in FIG. 4 shows the pre-determined shape and dimension of the present invention before it is manipulated to form an asymmetrical conical shape. FIG. 4 shows a curved front edge with two straight side edges extending tangent from said front edge in a substantially parallel orientation. A central circular pivot aperture, 16, is located centrally to the two adjacent lobate panels (panel A and panel B) 26, 28. FIG. 4 also shows a lead in notch coupled with a central pivot aperture, 16. The mounting apertures, 18, and their respective locations on panels A and B 26, 28, are also shown. FIG. 3 illustrates how a final asymmetrical conical shape is achieved when panel A, 26, is slidably passed over subjacent panel B, 28, forming a double thickness elongate lobe portion, a central circular pivot aperture, 16, acting as a hinge or pivot point, and mounting apertures, 18, aligning to allow threaded hex head bolts, 22, to pass perpendicularly through panel A, 26, first and panel B, 28, second, to form the sheet into an asymmetrical conical shape, and also for reinforced attachment of the double thickness elongate lobe portion to a handle. The threaded hex head bolts, 22, then protrude to engage insert nuts, 24 (shown in FIG. 2) inserted into holes in a handle, 10.

FIG. 2 (back view), further illustrates the overlapping lobate panels A, and B, 26,28, and the mounted position of the double thickness elongate lobe appendage portion of the asymmetrical conical strainer-scoop device 30, and the reinforced attachment to the handle, (10) with conventional fasteners, insert nuts, 24.

DESCRIPTION—ADDITIONAL EMBODIMENT

Figure 5:
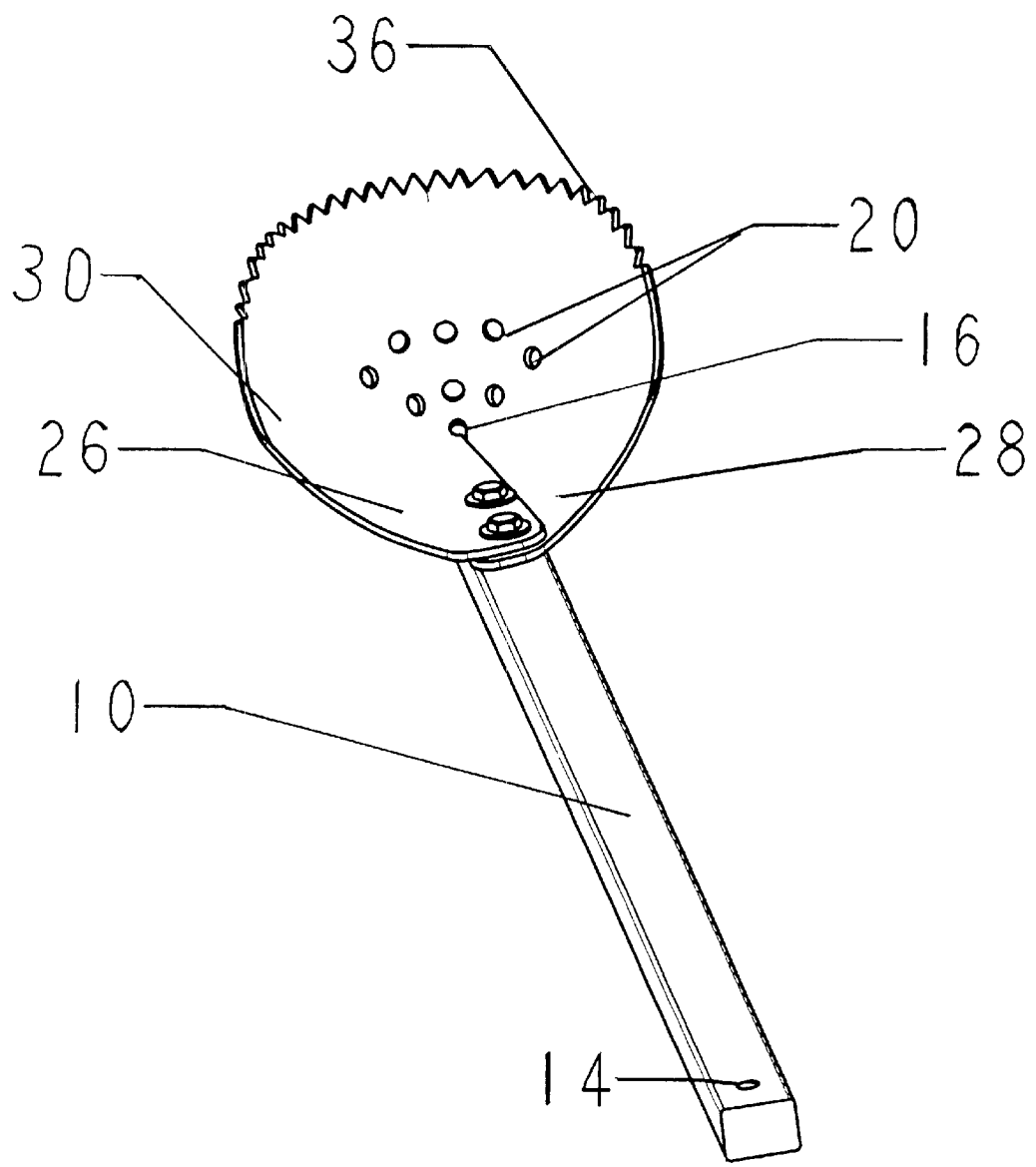
FIG. 5 shows an embodiment of an asymmetrical conical strainer-scoop with a toothed front edge to be utilized to scoop up canine fecal matter, or as a gardening scoop-hoe device.

FIG. 5 shows an additional embodiment of an asymmetrical conical strainer-scoop modified with an asymmetrical conical scoop, 30, having fewer straining apertures, 20, and with a toothed front edge, 36 to aid in separating and picking up canine fecal matter from grass, dirt, concrete, or other hard surface. This embodiment also includes a handle, 10, with a hole, 14, for a wrist-hanger strap.

OPERATION

FIGS. 1, 2 and 3

With an asymmetrical conical strainer-scoop as shown in FIG. 1, the handle, 10, is manually grasped at the upper end near the hole, 14. The asymmetrical conical strainer-scoop device, 30, which is fastened to the lower distal portion of the elongate handle member, 10, is lowered into the water under the ice chips and or chunks which float in the upper portion of [of] the bore or hole. The asymmetrical conical strainer-scoop is brought up and out of the water with a lifting motion, pausing several inches above the surface of the water to allow the water which is co-mingled with the ice chips, slush, ice chunks, etc, to drain out through the straining apertures, 20. The remaining contents, (ice chips, etc) are then emptied and discarded, and the process is repeated and continued until all debris is cleared from the hole.

Tests have shown that if the straining apertures, 20, freeze shut in sub-freezing or sub-zero temperatures, the UHMW asymmetrical conical strainer-scoop device, 30, can be struck forcibly on the ice or other hard surface, or flexed to remove the residual ice buildup from the apertures and surfaces of the strainer-scoop without cracking or breakage occurring.

Tests have also shown that the device accomplishes the straining, clearing process more quickly and efficiently than other commercially available strainer apparatus. It also is capable of removing large ice chunks of sufficient weight and size to bend or break other strainer devices. The elongate handle, 10, is comprised of a white ash wood hockey stick handle of sufficient strength and length to accommodate two handed use for scooping larger quantities of ice chips and large ice chunks, and can also be utilized as a snow scooping shovel.

CONCLUSIONS, RAMIFICATIONS, AND SCOPE

Accordingly, the reader will see that the asymmetrical conical strainer-scoop of this invention can be used to clear a hole drilled through the ice of debris such as ice chips quickly and efficiently. In addition, when sub-freezing temperatures cause ice residue to form on the invention, it is constructed in a sturdy manner, and consists of superior materials which will not crack, break, or otherwise fail when sufficient force and stresses are effected to remove the residual ice buildup.

Furthermore, the invention has other advantages such as:

It is constructed of lightweight materials which float in water.

It utilizes a sturdy white ash wood hockey stick handle of sufficient length to aid in efficient use without undue bending and stooping. The handle also features an attached wrist-hanging strap.

The handle has a useful graphic feature; a ruled measuring device, to aid fishermen in determining ice thickness and fish length.

The asymmetrical conical strainer-scoop device can be constructed in varying sizes.

The asymmetrical conical strainer-scoop device can be constructed of UHMW polyethylene in sheet form. UHMW poly is used extensively in snowmobile production, and has proven to be a plastic with excellent resilience, toughness, and impact resistance in sub-freezing and sub-zero temperatures.

Although the description above has been described in considerable detail with reference to certain preferred versions thereof, other versions are possible. It should also be stated that although this invention is described in the context of ice fishing, this invention would be equally useful in other activities where a light weight, durable perforated scooping implement could be utilized, such as a canine fecal matter scoop or a gardening combination weeding-scoop hoe type device. Another ramification of the design could include fastening the asymmetrical conical strainer-scoop to an endless belt or a wheel for material conveying purposes. Yet another possible usage would be as a sport apparatus whereby the scoop and handle unit is used to scoop up, throw, catch, and carry a ball or other object toward a goal similar to the sports of hockey or lacrosse. Therefore, the spirit and scope of the appended claims should not be limited to the preferred versions contained herein.

I claim:

1. An asymmetrical perforated conical scooping device with means of attachment by fasteners to a distal portion of an elongate handle member, said asymmetrical perforated conical scooping device comprising a sheet of flexible non-metallic material of predetermined dimensions and possessing a plurality of apertures passing there through, said predetermined dimensions including a front edge, and having two straight side edges extending tangent from said front edge in a substantially parallel orientation, and having a lead in notch coupled with a central circular pivot aperture whereby two panels of said sheet adjacent to said lead in notch can be overlapped allowing said fasteners to pass through aligned mounting apertures to form said sheet into an asymmetrical conical shape, and wherein said overlapping panels form a double thickness elongate lobe portion of said asymmetrical perforated conical scooping device for reinforced attachment to said handle member.

2. A device as set forth in claim 1 wherein said asymmetrical perforated conical scooping device is composed of a sheet of UHMW polyethylene.

3. A device as set forth in claim 1 wherein said asymmetrical perforated conical scooping device includes a plurality of circular straining apertures and includes a central circular pivot aperture located so as to communicate with a lead in notch cut from one edge of said sheet thereby forming two panels adjacent to said notch and also adjacent to said central circular pivot aperture whereby said panels can be urged slidably together in an overlapping fashion with one panel subjacent to said other panel and with said circular pivot aperture acting as a pivotal hinge point of said overlapping panels whereby said sheet acquires an asymmetrical conical shape.

4. A device as set forth in claim 3 wherein said mounting apertures preserve said conical shape of said asymmetrical perforated conical scooping device and attach said asymmetrical perforated conical scooping device by conventional fasteners to said distal portion of said elongate handle member.

5. A device as set forth in claim 1 wherein said predetermined dimensions include a portion of said front edge shaped into an arcuate dimension to facilitate removal of debris suspended in liquid in a circular bore, whereby said arcuate dimension approximates the dimension of said circular bore for means of maximizing efficiency of said removal of debris.

6. A device as set forth in claim 1 wherein said asymmetrical perforated conical scooping device includes a plurality of straining apertures for means of facilitating separation of debris suspended in fluid.

7. A device as set forth in claim 1 wherein said asymmetrical perforated conical scooping device is attached to said elongate handle member by means of conventional fasteners, said conventional fasteners comprising; bolts, screws, rivets, staples, nails, flat washers, propel nuts, hex nuts, insert nuts.

8. A device as set forth in claim 1 wherein said elongate handle is comprised of wood, said elongate wood handle being consistent in type and dimensions with a conventional wood hockey stick handle.

9. A device as set forth in claim 1 wherein said elongate handle is comprised of wood, plastic tubing, foam filled plastic tubing, rigid plastic foam, fiberglass, or composite material, and wherein said elongate handle is comprised of varying lengths and comprising cross-sectional dimensions including; round, oval, square, rectangular, or triangular.

10. A device as set forth in claim 1 wherein said sheet of flexible non-metallic material comprises plastic material including; polycarbonate, polyurethane, high density polyethylene, nylon, low density polyethylene.

11. A device as set forth in claim 1 wherein said sheet of flexible non-metallic material of predetermined dimension includes an approximately circular peripheral dimension.

12. A device as set forth in claim 1 wherein said front edge includes a plurality of notched recesses creating a toothed edge for means of separating and scooping solid matter from grass, snow, concrete, dirt or other surface.

13. A scooping device, comprising:

a sheet of flexible, durable polymeric material formed into a substantially asymmetrical conical shape; and a handle coupled to the sheet using one or more fasteners;

wherein the sheet includes a front edge, and includes substantially parallel side edges extending tangent from the front edge and connecting to a back edge; and wherein the sheet contains a plurality of spaced-apart holes passing there through, including a circular pivot hole; the circular pivot hole opened by a notch from the back edge; and wherein two portions of the sheet adjacent to the pivot hole have been urged together to overlap and;

wherein mounting holes align to allow fasteners to pass through the overlapped portions; and wherein the overlapped portions form a reinforced double thickness lobate portion of the sheet coupled to the handle using the fasteners.

14. The scooping device of claim 13, wherein the sheet comprises a sheet of UHMW polyethylene.

15. The scooping device of claim 13, wherein the handle comprises a non-metallic handle made of floatable material, and wherein the handle contains ruling marks.

16. The scooping device of claim 13 wherein the sheet has a plurality of notched recesses to create a toothed edge along an edge of the sheet.

* * * * *